United States Patent
Qian et al.

(10) Patent No.: US 11,909,068 B2
(45) Date of Patent: Feb. 20, 2024

(54) BATTERY, POWER CONSUMING APPARATUS, AND METHOD AND APPARATUS FOR MANUFACTURING BATTERY

(71) Applicant: CONTEMPORARY AMPEREX TECHNOLOGY CO., LIMITED, Ningde (CN)

(72) Inventors: Ou Qian, Ningde (CN); Piaopiao Yang, Ningde (CN); Yufeng Zhang, Ningde (CN); Xiaobo Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/353,706

(22) Filed: Jul. 17, 2023

(65) Prior Publication Data
US 2023/0361424 A1    Nov. 9, 2023

Related U.S. Application Data

(63) Continuation of application No. PCT/CN2022/071925, filed on Jan. 14, 2022.

(51) Int. Cl.
*H01M 50/392* (2021.01)
*H01M 50/367* (2021.01)
(Continued)

(52) U.S. Cl.
CPC ....... *H01M 50/392* (2021.01); *H01M 50/107* (2021.01); *H01M 50/213* (2021.01); *H01M 50/367* (2021.01); *H01M 2220/20* (2013.01)

(58) Field of Classification Search
CPC .. H01M 50/358; H01M 50/367; H01M 50/30; H01M 50/325; H01M 50/342;
(Continued)

(56) References Cited

U.S. PATENT DOCUMENTS

| 2003/0064283 A1 | 4/2003 | Uemoto et al. |
| 2022/0013755 A1 | 1/2022 | Chen et al. |

(Continued)

FOREIGN PATENT DOCUMENTS

| CN | 208298909 | * | 1/2018 | ............... H01M 2/12 |
| CN | 207587793 U |   | 7/2018 | |

(Continued)

OTHER PUBLICATIONS

The World Intellectual Property Organization (WIPO) International Search Report and Written Opinion for PCT/CN2022/071925 dated Sep. 26, 2022 16 pages (including English translation).

*Primary Examiner* — Amanda J Barrow
(74) *Attorney, Agent, or Firm* — ANOVA LAW GROUP, PLLC

(57) ABSTRACT

A battery includes a cylindrical battery cell having a cylindrical side surface provided with a pressure relief mechanism, an electrical chamber configured to accommodate the battery cell, a collection chamber configured to collect emissions from the battery cell when the pressure relief mechanism is actuated, and an isolation component configured to isolate the electrical chamber from the collection chamber. The isolation component includes a first region and a second region. The first region is used for accommodating a first portion of the battery cell such that the first portion protrudes, towards the collection chamber, from a surface of the second region facing towards the collection chamber, and the pressure relief mechanism is disposed in a region of the cylindrical side surface located in the first portion such (Continued)

that the emissions are allowed to enter the collection chamber when the pressure relief mechanism is actuated.

18 Claims, 8 Drawing Sheets

(51) Int. Cl.
*H01M 50/107* (2021.01)
*H01M 50/213* (2021.01)

(58) Field of Classification Search
CPC ........... H01M 50/3425; H01M 50/375; H01M 50/107; H01M 10/0422; H01M 50/20; H01M 50/202; H01M 50/204; H01M 50/207; H01M 50/213; H01M 50/244
See application file for complete search history.

(56) References Cited

U.S. PATENT DOCUMENTS

| | | | |
|---|---|---|---|
| 2022/0013757 A1* | 1/2022 | Wu ................... | H01M 50/249 |
| 2022/0013849 A1* | 1/2022 | Zeng ................... | H01M 10/42 |
| 2022/0013854 A1 | 1/2022 | Liang et al. | |
| 2022/0021068 A1* | 1/2022 | Zeng ................... | H01M 50/271 |
| 2023/0223642 A1* | 7/2023 | Gu ....................... | H01M 50/107 |
| | | | 429/56 |
| 2023/0344059 A1* | 10/2023 | Li ....................... | H01M 10/0404 |

FOREIGN PATENT DOCUMENTS

| | | | | |
|---|---|---|---|---|
| CN | 213026309 U | | 4/2021 | |
| CN | 213584016 U | | 6/2021 | |
| KR | 10-2018-0043996 | * | 5/2018 | ............ H01M 50/30 |

* cited by examiner

BATTERY, POWER CONSUMING APPARATUS, AND METHOD AND APPARATUS FOR MANUFACTURING BATTERY

CROSS-REFERENCE TO RELATED APPLICATION

This application is a continuation of International Application No. PCT/CN2022/071925, filed on Jan. 14, 2022, the entire content of which is incorporated herein by reference.

TECHNICAL FIELD

The present application relates to the technical field of batteries, and in particular to a battery, a power consuming apparatus, and a method and apparatus for manufacturing the battery.

BACKGROUND ART

Energy conservation and emission reduction are the keys to the sustainable development of the automobile industry. In this case, electric vehicles have become an important part of the sustainable development of the automobile industry due to their advantages in energy conservation and environmental protection. Further, for the electric vehicles, the battery technology is an important factor to their development.

In the development of the battery technology, in addition to improving the performance of batteries, the safety is also a non-negligible issue. If the safety of the batteries cannot be guaranteed, the batteries cannot be used. Therefore, how to enhance the safety of batteries is an urgent technical problem to be solved in the battery technology.

SUMMARY

Embodiments of the present application provide a battery, a power consuming apparatus, and a method and apparatus for manufacturing the battery, which can improve battery safety.

In a first aspect, provided is a battery, including: a plurality of battery cells, the battery cell being of a cylinder shape, a cylindrical side surface of the battery cell being provided with a pressure relief mechanism, the pressure relief mechanism being configured to be actuated, when an internal pressure or temperature of the battery cell reaches a threshold, to relieve the internal pressure of the battery cell; an electrical chamber configured to accommodate the plurality of battery cells; a collection chamber configured to collect emissions from the battery cell when the pressure relief mechanism is actuated; and an isolation component configured to isolate the electrical chamber from the collection chamber, wherein the isolation component includes a first region and a second region, the first region is used for accommodating a first portion of the battery cell such that the first portion protrudes, towards the collection chamber, from a surface of the second region facing towards the collection chamber, and the pressure relief mechanism is disposed in a region of the cylindrical side surface located in the first portion such that the emissions are allowed to enter the collection chamber when the pressure relief mechanism is actuated.

Therefore, in the battery according to this embodiment of the present application, the battery cell can be positioned and fixed by the first region of the isolation component, so that rolling of the battery cell is prevented and the stability of the battery is improved. Moreover, the first portion protrudes from the electrical chamber relative to the second region, that is, the battery cell can occupy part of space of the collection chamber, thus improving the space utilization of the battery. In addition, the pressure relief mechanism of the battery cell is located on the first portion so that the emissions are allowed to enter the collection chamber when the pressure relief mechanism is actuated. Accordingly, the purpose of directional emission is achieved, and the impact of the emissions on the electrical chamber is prevented, that is, the contact between the emissions and a high-voltage connection component in the electrical chamber is prevented, thereby reducing a risk of explosion of the battery and improving the safety of the battery.

In some embodiments, the length, in an axial direction of the battery cell, of an orthographic projection of the first region on a surface of the isolation component facing towards the electrical chamber is greater than or equal to the length, in the axial direction of the battery cell, of the cylindrical side surface of the battery cell; and the length, in a second direction, of the orthographic projection is less than the diameter of the battery cell, wherein the second direction is a direction perpendicular to the axial direction of the battery cell in a plane where the orthographic projection is located.

In this way, for the first portion of the battery cell located in the first region, the first portion is only a partial region and not the whole of the battery cell and is a small region of the battery cell, and accordingly, the first portion does not occupy too much region of the collection chamber and has less impact on the collection chamber.

In some embodiments, the first region is an opening extending through the isolation component.

In one aspect, it is easy to machine the opening. In another aspect, when the pressure relief mechanism located in the first portion is actuated, there is no obstruction and the emissions can be directly discharged to the collection chamber through the opening, and the internal pressure and temperature of the battery cell with thermal runaway can be relieved in time to prevent thermal diffusion and improve the safety of the battery.

In some embodiments, the isolation component has circular-arc surfaces at the opening to allow the first portion to fit the isolation component inside the opening.

The battery cell and the isolation component have a surface contact instead of a linear contact, which expands the area of contact between the two. Accordingly, in one aspect, the stability of the battery cell in the first region can be improved and the battery cell is less prone to displacement, and in another aspect, when the isolation component is a thermal management component, the temperature adjustment efficiency can also be improved.

In some embodiments, the first region is a recess on the isolation component, and the recess protrudes, towards the collection chamber, from the surface of the second region facing towards the collection chamber.

In this way, when the battery is in normal use, the electrical chamber and the collection chamber on two sides of the isolation component are relatively enclosed. When thermal runaway occurs in any of the battery cells, the pressure relief mechanism of the battery cell is actuated such that the emissions are discharged, and the emissions can rupture the recess of the first region corresponding to the pressure relief mechanism to be allowed to enter the collection chamber. Moreover, since the recesses of the first region at other positions are not ruptured, the emissions (especially high-temperature gases or flames) entering the collection chamber will not return to the electrical chamber through the first region at other positions, and accordingly, the impact on another battery cell can be prevented, the possibility of thermal diffusion can be reduced, and the safety of the battery is improved.

In some embodiments, the recess has a circular-arc cross-section in a first plane, and the first plane is a plane perpendicular to the axial direction of the battery cell. The recess with a circular-arc cross-section occupies less space in the collection chamber and has less influence on the arrangement of the collection chamber as compared with recesses in other shapes.

In some embodiments, the first portion fits the isolation component inside the recess. In this case, the area of contact between the battery cell and the isolation component is a circular-arc surface instead of a linear contact, thus the area of contact between the two is expanded. Accordingly, in one aspect, the stability of the battery cell in the first region can be improved, and in another aspect, when the isolation component is a thermal management component, the temperature adjustment efficiency can also be improved.

In some embodiments, the recess has a rectangular cross-section in a first plane, and the first plane is a plane perpendicular to the axial direction of the battery cell. The rectangular recess is simple in structure and easy to machine.

In some embodiments, the isolation component has circular-arc surfaces at the opening of the recess to allow the first portion to fit the isolation component at the opening of the recess. The battery cell and the isolation component have a surface contact instead of a linear contact, which expands the area of contact between the two. Accordingly, in one aspect, the stability of the battery cell in the first region can be improved, and in another aspect, when the isolation component is a thermal management component, the temperature adjustment efficiency can also be improved.

In some possible embodiments, the electrical chamber is provided with a filler inside, and the filler is used to fill voids between the plurality of battery cells.

In one aspect, the filler may provide restraint for the battery cell inside to prevent the battery cell from moving. In another aspect, the filler may also restrict a shell of the battery cell, increase the strength of the shell, and prevent the portion of the surface of the battery cell located inside the electrical chamber other than the first portion from being ruptured when thermal runaway occurs in a certain battery cell, thereby preventing the spread of thermal runaway and improving safety performance of the battery.

In some embodiments, the electrical chamber accommodates a plurality of battery cell groups arranged in a first direction, each of the plurality of battery cell groups includes a plurality of battery cells arranged in a second direction, the first direction, the second direction and the axial direction of the battery cell are perpendicular to each other, and the plurality of battery cells of the same battery cell group correspond to the same isolation component.

The plurality of battery cells in the battery are arranged in a regular pattern, which can increase the space utilization of the battery. Since the plurality of battery cells of the same battery cell group are disposed to correspond to the same isolation component, the plurality of battery cells correspond to the same collection chamber, that is, the emissions discharged from the pressure relief mechanisms of the plurality of battery cells can be discharged to the same collection chamber, thereby saving space and improving the space utilization of the battery.

In some embodiments, the plurality of battery cells of the same battery cell group are in a one-to-one correspondence with a plurality of first regions on the same isolation component, so that it is possible to ensure that each battery cell can discharge emissions towards the collection chamber directionally when thermal runaway occurs in the battery cell, and moreover, each battery cell can be positioned and mounted by the first region such that the first portion of the battery cell can be located in the first region, thus improving the stability of the battery.

In some embodiments, two adjacent battery cell groups of the plurality of battery cell groups correspond to two isolation components disposed opposite each other, such that the electrical chamber is disposed between the two isolation components and the electrical chamber is located between two collection chambers.

For any two adjacent battery cell groups in the first direction, the two battery cell groups are disposed in the same electrical chamber, so that space of the electrical chamber can be saved by staggering of battery cells of the two battery cell groups. In this case, the two collection chambers corresponding to the two battery cell groups may be located on two opposite sides of the electrical chamber, so that the thickness of the battery in the first direction can be minimized.

In some embodiments, the battery further includes two end plates, the two end plates are respectively disposed, in the axial direction of the battery cells, on two sides of the two adjacent battery cell groups, and the two end plates are connected to the two isolation components to form the electrical chamber.

The two end plates are respectively disposed, in the axial direction of the battery cells, on two sides of the two adjacent battery cell groups, so that the movement, in the axial direction of the battery cells, of the battery cells of the two battery cell groups can be further restricted to fix the battery cells and improve the stability of the battery.

In some embodiments, each end plate of the two end plates is provided with a first protrusion protruding in the first direction, the isolation component is provided with a first through-hole, and the first protrusion passes through the first through-hole such that each of the end plates is fixedly connected to the isolation component; or, each end plate of the two end plates is provided with a second through-hole, the isolation component is provided with a second protrusion protruding in the axial direction of the battery cell, and the second protrusion passes through the second through-hole such that each of the end plates is fixedly connected to the isolation component.

The isolation component and the end plate are fixed by cooperation between the protrusion and the through-hole, thereby facilitating machining, mounting and assembling, and further improving the production efficiency of the battery.

In a second aspect, provided is a power consuming apparatus, including: the battery described in the first aspect or in any one of the embodiments in the first aspect.

In some embodiments, the power consuming apparatus is a vehicle, a ship, or a spacecraft.

In a third aspect, provided is a method for manufacturing a battery, including: providing a plurality of battery cells, the battery cell being of a cylinder shape, a cylindrical side surface of the battery cell being provided with a pressure relief mechanism, the pressure relief mechanism being configured to be actuated, when an internal pressure or temperature of the battery cell reaches a threshold, to relieve the internal pressure; providing an electrical chamber, the electrical chamber being configured to accommodate the plurality of battery cells; providing a collection chamber, the collection chamber being configured to collect emissions from the battery cell when the pressure relief mechanism is actuated; and providing an isolation component, the isolation component being configured to isolate the electrical chamber from the collection chamber, wherein the isolation component includes a first region and a second region, the first region is used for accommodating a first portion of the battery cell such that the first portion protrudes, towards the collection chamber, from a surface of the second region facing towards the collection chamber, and the pressure relief mechanism is arranged in a region of the cylindrical side surface located in the first portion such that the emissions are allowed to enter the collection chamber when the pressure relief mechanism is actuated.

In a fourth aspect, provided is an apparatus for manufacturing a battery, the apparatus including a module configured to perform the method of the third aspect above.

Figure 1:
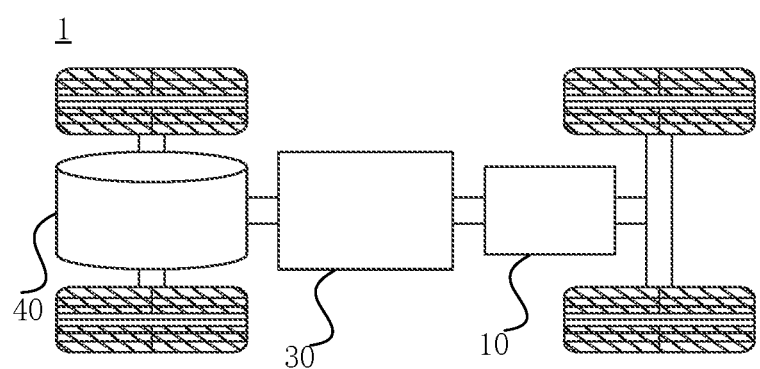
FIG. 1 is a schematic diagram of a vehicle disclosed in an embodiment of the present application.

In the accompanying drawings, the figures are not drawn to scale.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example and are not intended to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of tolerance. The term "parallel" does not mean being parallel in the strict sense, but within an allowable range of tolerance.

The orientation terms in the following description all indicate directions shown in the accompanying drawings, and do not limit the specific structure in the present application. In the description of the present application, it should also be noted that the terms "mounting", "connect", and "connection" should be interpreted in the broad sense unless explicitly defined and limited otherwise. For example, the connection may be a fixed connection, a detachable connection, or an integral connection, or may be a direct connection, or an indirect connection by means of an intermediate medium. For those of ordinary skill in the art, the specific meanings of the terms mentioned above in the present application can be construed according to specific circumstances.

In the embodiments of the present application, the same reference numerals denote the same components, and for the sake of brevity, the detailed description of the same components is omitted in different embodiments. It should be understood that the dimensions, such as thickness, length, and width, of the various components in the embodiments of the present application showed in the accompanying drawings, as well as the dimensions, such as an overall thickness, length, and width, of an integrated device are merely illustrative and should not be construed to limit the present application in any way.

In this disclosure, the phrases "at least one of A, B, and C" and "at least one of A, B, or C" both mean only A, only B, only C, or any combination of A, B, and C.

In the present application, a battery cell may include a lithium ion secondary battery, a lithium ion primary battery, a lithium-sulfur battery, a sodium-lithium ion battery, a sodium ion battery or a magnesium ion battery, etc., which will not be limited in the embodiments of the present application. The battery cell may be cylindrical, flat, cuboid or in other shapes, which is also not limited in embodiments of the present application. The battery cells are generally classified into three types depending on the way of package: cylindrical battery cells, prismatic battery cells and pouch battery cells, which also will not be limited in the embodiments of the present application.

A battery mentioned in embodiments of the present application refers to a single physical module including one or more battery cells to provide a higher voltage and capacity. For example, the battery mentioned in the present application may include a battery module, a battery pack, etc. The battery generally includes an enclosure for packaging one or more battery cells. The enclosure can prevent liquid or other foreign matters from affecting charging or discharging of the battery cell(s).

The battery cell includes an electrode assembly and an electrolyte. The electrode assembly is composed of a positive electrode plate, a negative electrode plate and a separator. The battery cell operates mainly by relying on movements of metal ions between the positive electrode plate and the negative electrode plate. The positive electrode plate includes a positive electrode current collector and a positive electrode active material layer. A surface of the positive electrode current collector is coated with the positive electrode active material layer, the positive electrode current collector not coated with the positive electrode active material layer protrudes from the positive electrode current collector coated with the positive electrode active material layer, and the positive electrode current collector not coated with the positive electrode active material layer serves as a positive tab. Taking a lithium ion battery as an example, the positive electrode current collector may be made of an aluminum, and the positive electrode active material may be lithium cobalt oxide, lithium iron phosphate, ternary lithium, lithium manganate, etc. The negative electrode plate includes a negative electrode current collector and a negative electrode active material layer. A surface of the negative electrode current collector is coated with the negative electrode active material layer, the negative electrode current collector not coated with the negative electrode active material layer protrudes from the negative electrode current collector coated with the negative electrode active material layer, and the negative electrode current collector not coated with the negative electrode active material layer serves as a negative tab. The negative electrode current collector may be made of copper, and the negative electrode active material may be carbon, silicon, etc. In order to ensure that no fusing occurs when a large current passes, there are a plurality of positive tabs are provided and are stacked together, and a plurality of negative tabs are provided and are stacked together. The separator may be made of a material such as polypropylene (PP) and polyethylene (PE). In addition, the electrode assembly may be of a wound structure or a laminated structure, which will not be limited in the embodiments of the present application.

For development of the battery technology, various design factors should be considered at the same time, such as energy density, cycling life, discharge capacity, charge-discharge rates and other performance parameters as well as the battery safety.

For a battery, the main safety hazards come from charging and discharging processes. In order to improve the safety performance of the battery, a pressure relief mechanism is usually provided for a battery cell. The pressure relief mechanism refers to an element or component that is actuated, when an internal pressure or temperature of the battery cell reaches a predetermined threshold, to relieve the internal pressure or heat. The predetermined threshold may be adjusted based on different design requirements. The predetermined threshold may depend on materials of one or more of the positive electrode plate, the negative electrode plate, the electrolyte, and the separator in the battery cell. The pressure relief mechanism may be an element or component that is sensitive to pressure or temperature, that is, when the internal pressure or temperature of the battery cell reaches the predetermined threshold, the pressure relief mechanism is actuated, so as to form a channel for relief of the internal pressure or heat.

The "actuated" mentioned in the present application means that the pressure relief mechanism acts, so that the internal pressure and heat of the battery cell can be relieved. Actions produced by the pressure relief mechanism may include, but are not limited to, at least a part of the pressure relief mechanism being cracked, torn, or melted, etc. After the pressure relief mechanism is actuated, high-temperature and high-pressure substances inside the battery cell are discharged outward from the pressure relief mechanism as emissions. In this way, the pressure of the battery cell can be relieved under a condition of a controllable pressure or temperature, thereby preventing the occurrence of potentially more serious accidents.

The emissions from the battery cell mentioned in the present application include, but are not limited to, the electrolyte, dissolved or split positive and negative electrode plates, fragments of the separator, a high-temperature and high-pressure gas generated by a reaction, flames, etc.

The pressure relief mechanism on the battery cell has an important influence on the safety of the battery. For example, when a battery cell is short-circuited, overcharged, etc., the battery cell may be internally subjected to thermal runaway, so that the pressure or temperature may suddenly rise. In this case, the internal pressure and heat can be released outward by means of the actuation of a pressure relief mechanism to prevent the battery cell from exploding and catching fire.

Therefore, considering that in a battery assembly process, taking rectangular-shaped battery cells as an example, the adjacent battery cells usually abut against each other through a wall with larger area, therefore, the pressure relief mechanism may be disposed on a wall with smaller area of the battery cell, for example, the pressure relief mechanism may be disposed on a cover plate at the top end of the battery cell so that the impact on performance of the pressure relief mechanism is prevented to ensure safety performance of the battery. However, for a non-rectangular shaped battery cell, such as a cylindrical battery cell, due to the shape limitation of the battery cell, if the pressure relief mechanism is disposed on a round cover plate at the top end, when thermal runaway occurs in the battery cell, poor pressure relief may be caused, which is easy to lead to explosion of the battery cell. Moreover, when pressure is relieved from the cover plate at the top end, the gas emission is more likely to be in contact with the high and low voltage components, which will trigger a high-voltage ignition and intensify thermal diffusion between the battery cells. However, if the pressure relief mechanism is disposed at another position of the battery cell, due to shape features of the cylindrical battery cell, it is also necessary to consider how to prevent the influence of the pressure relief mechanism on each battery cell when assembling the battery.

Therefore, the embodiments of the present application provide a battery. The battery includes a plurality of cylindrical battery cells, and a cylindrical side surface of the battery cell is provided with a pressure relief mechanism. The battery further includes an electrical chamber and a collection chamber that are isolated by an isolation component, the electrical chamber being configured to accommodate the plurality of battery cells; and the collection chamber being configured to collect emissions from the battery cell when the pressure relief mechanism is actuated. The isolation component is provided with a first region and a second region, the first region is used for accommodating a first portion of the battery cell such that the first portion protrudes, towards the collection chamber, from the surface of the second region facing towards the collection chamber. In this way, the battery cell can be positioned and fixed by the first region of the isolation component so that rolling of the battery cell is prevented and the stability of the battery is improved. Moreover, the first portion protrudes from the electrical chamber relative to the second region, that is, the battery cell can occupy part of space of the collection chamber, thus improving the space utilization of the battery. In addition, the pressure relief mechanism of the battery cell is located on the first portion so that the emissions are allowed to enter the collection chamber when the pressure relief mechanism is actuated. Accordingly, the purpose of directional emission is achieved, and the impact of the emissions on the electrical chamber is prevented, that is, the contact between the emissions and a high-voltage connection in the electrical chamber is prevented, thereby reducing a risk of explosion of the battery and improving the safety of the battery.

The technical solution described in the embodiments of the present application is applicable to various power consuming apparatuses using batteries.

The power consuming apparatus may be a vehicle, a mobile phone, a portable device, a notebook computer, a ship, a spacecraft, an electric toy, an electric tool, etc. The vehicle may be a fuel vehicle, a gas vehicle or a new-energy vehicle. The new-energy vehicle may be a battery electric vehicle, a hybrid vehicle, an extended-range vehicle, etc. The spacecraft includes an airplane, a rocket, an aerospace plane, a spaceship, etc. The electric toy includes a stationary or mobile electric toy, such as a game machine, an electric toy car, an electric toy ship, and an electric toy airplane. The electric tool includes an electric metal cutting tool, an electric grinding tool, an electric assembling tool, and an electric railway tool, such as an electric drill, an electric grinder, an electric wrench, an electric screwdriver, an electric hammer, an electric impact drill, a concrete vibrator, and an electric planer. The power consuming apparatuses mentioned above are not specially limited in the embodiments of the present application.

For ease of description, an example in which the power consuming apparatus refers to a vehicle is used for description in the following embodiments.

For example, FIG. 1 shows a schematic diagram of a vehicle 1 according to an embodiment of the present application. The vehicle 1 may be a fuel vehicle, a gas vehicle, or a new-energy vehicle. The new-energy vehicle may be a battery electric vehicle, a hybrid vehicle, an extended-range vehicle, etc. The vehicle 1 may be internally provided with a motor 40, a controller 30 and a battery 10. The controller 30 is used for controlling the battery 10 to supply power to the motor 40. For example, the battery 10 may be arranged at a bottom, a head or a tail of the vehicle 1. The battery 10 may be used for supplying power to the vehicle 1. For example, the battery 10 may serve as a power source for operating the vehicle 1 for use in a circuit system of the vehicle 1, for example, to meet the working power demand of the vehicle 1 during startup, navigation and running. In another embodiment of the present application, the battery 10 may not only serve as a power source for operating the vehicle 1, but may also serve as a power source for driving the vehicle 1, replacing or partially replacing fuel or natural gas, to provide driving power for the vehicle 1.

The battery may include a plurality of battery cells in order to meet different power demands, with the plurality of battery cells being in series connection, in parallel connection, or in series-parallel connection. The series-parallel connection refers to a combination of series connection and parallel connection. The battery may also be referred to as a battery pack. Optionally, the plurality of battery cells may be in series connection or in parallel connection or in series-parallel connection to constitute a battery module, and then a plurality of battery modules may in series connection or in parallel connection or in series-parallel connection to constitute the battery. That is to say, the plurality of battery cells may directly constitute the battery, or may first constitute the battery modules that may then constitute the battery. The embodiments of the present application are not limited thereto.

Figure 2:
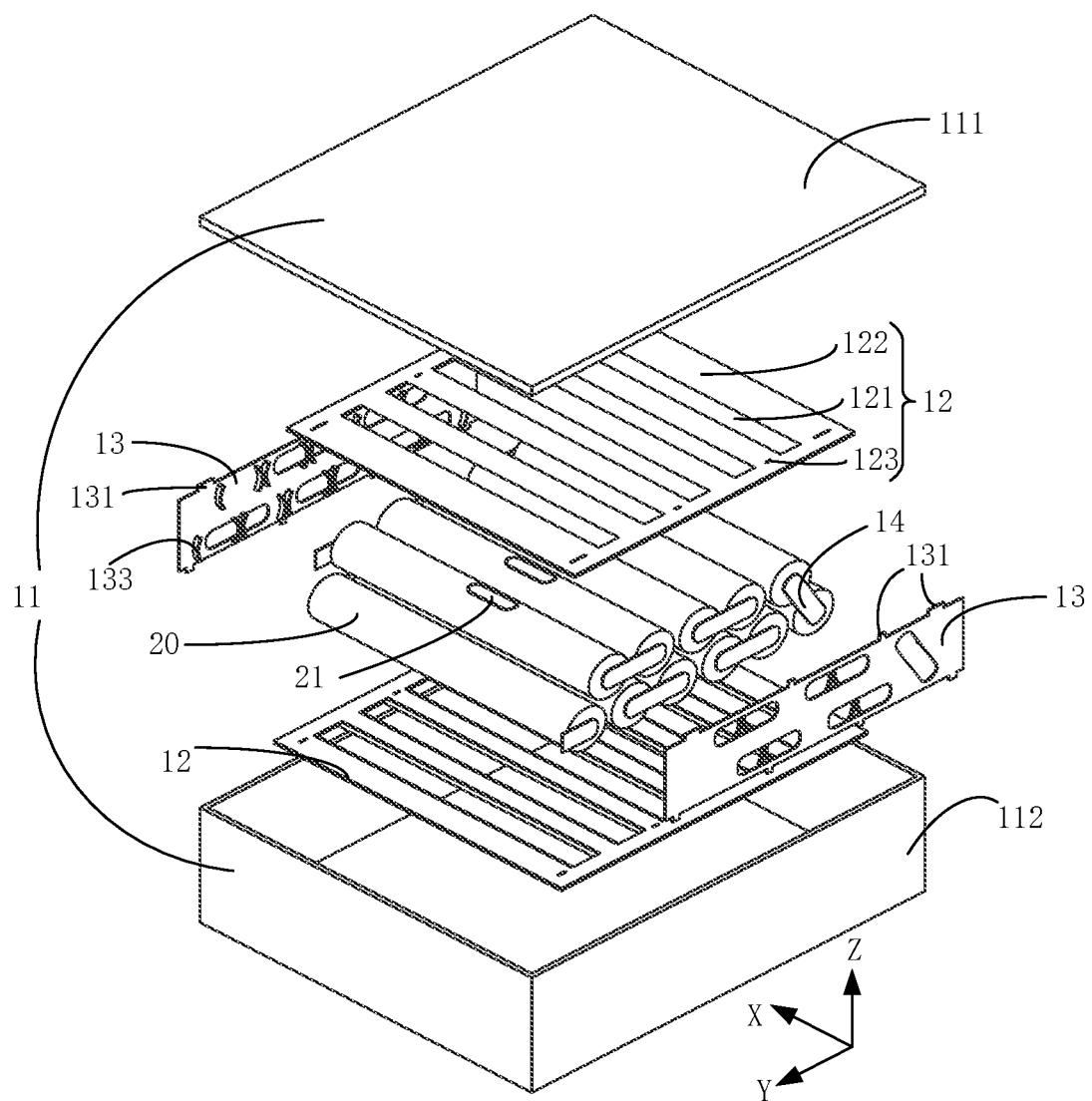
FIG. 2 is an exploded view of a battery disclosed in an embodiment of the present application.
Figure 3:
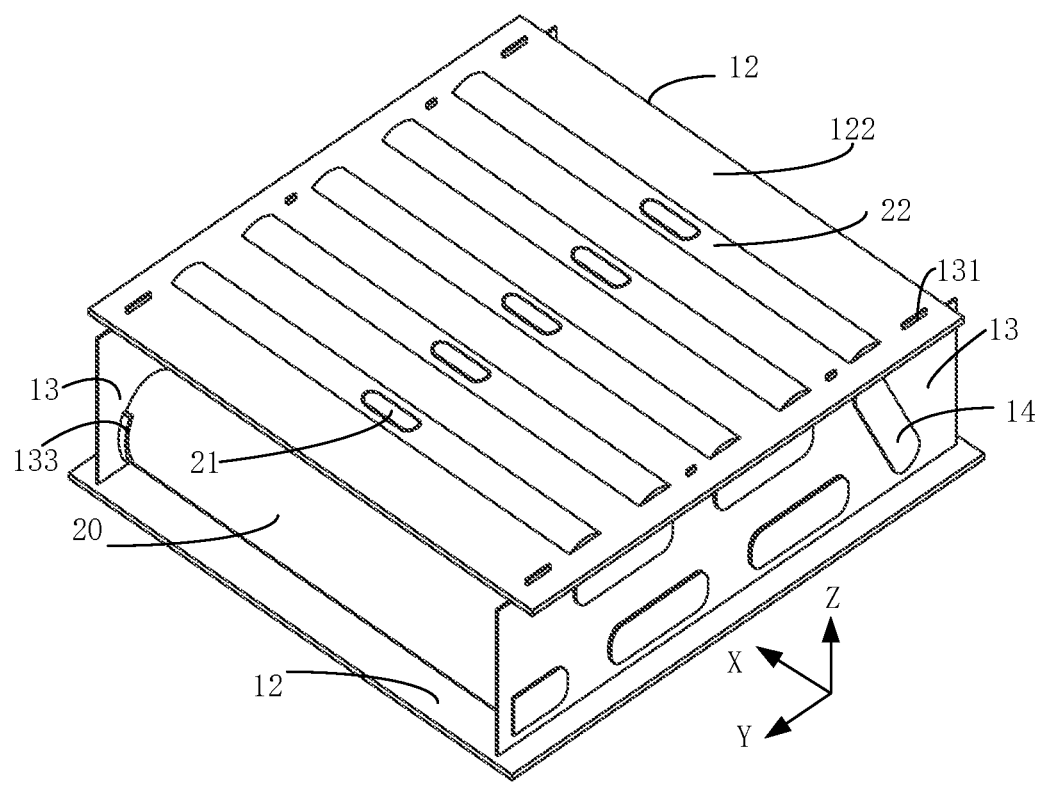
FIG. 3 is a partial schematic diagram of a battery disclosed in an embodiment of the present application.
Figure 4:
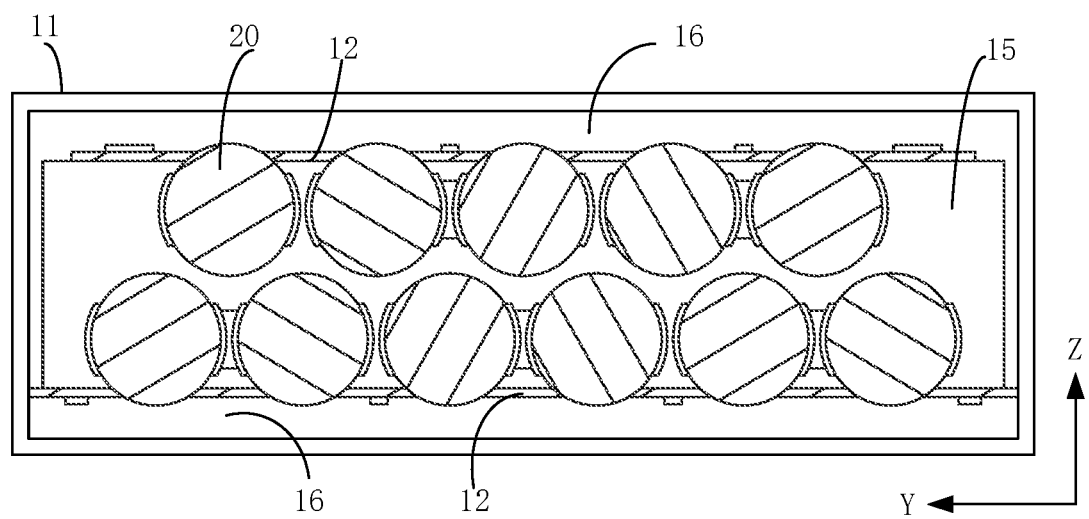
FIG. 4 is a cross-sectional diagram of a battery disclosed in an embodiment of the present application.

FIG. 2 shows an exploded view of a battery 10 according to an embodiment of the present application. FIG. 3 shows a schematic diagram of an assembly of some components in a battery 10 according to an embodiment of the present application. For example, FIG. 3 is a schematic diagram of an assembly of some components in the battery 10 shown in FIG. 2. FIG. 4 shows a cross-sectional view of a battery 10 according to an embodiment of the present application. For example, the battery 10 may have an assembly structure of the battery 10 shown in FIG. 2. The cross-section may be a plane perpendicular to an axial direction of a battery cell in the battery. As shown in FIGS. 2 to 4, the battery 10 include: a plurality of battery cells 20, the battery cell 20 being of a cylinder shape, a cylindrical side surface of the battery cell 20 being provided with a pressure relief mechanism 21, the pressure relief mechanism 21 being configured to be actuated, when an internal pressure or temperature of the battery cell 20 reaches a threshold, to relieve the internal pressure of the battery cell 20; an electrical chamber 15 configured to accommodate the plurality of battery cells 20; a collection chamber 16 configured to collect emissions from the battery cell 20 when the pressure relief mechanism 21 is actuated; and an isolation component 12 configured to isolate the electrical chamber 15 from the collection chamber 16, wherein the isolation component 12 includes a first region 121 and a second region 122, the first region 121 is used for accommodating a first portion 22 of the battery cell 20 such that the first portion 22 protrudes, towards the collection chamber 16, from a surface of the second region 122 facing towards the collection chamber 16, and the pressure relief mechanism 21 is disposed in a region of the cylindrical side surface located in the first portion 22 such that the emissions are allowed to enter the collection chamber 16 when the pressure relief mechanism 21 is actuated.

Therefore, in the battery 10 according to the embodiments of the present application, the cylindrical battery cell 20 is positioned and fixed by the first region 121 provided on the isolation component 12 so that rolling of the battery cell 20 is prevented and the stability of the battery 10 is improved. Moreover, the first portion 22 of the battery cell 20 protrudes from the electrical chamber 15 relative to the second region 122, that is, the battery cell 20 can occupy part of space of the collection chamber 16, thus improving the space utilization of the battery 10. In addition, the pressure relief mechanism 21 of the battery cell 20 is located on the first portion 22 so that the emissions are allowed to enter the collection chamber 16 when the pressure relief mechanism 21 is actuated. Accordingly, the purpose of directional emission is achieved, and the impact of the emissions on the electrical chamber 15 is prevented, that is, the contact between the emissions and a high-voltage connection in the electrical chamber 15 is prevented, thereby reducing a risk of explosion of the battery 10 and improving the safety of the battery 10.

The battery 10 according to the embodiments of the present application includes the electrical chamber 15 and the collection chamber 16, optionally, the battery 10 further includes an enclosure 11 for forming the electrical chamber 15 and the collection chamber 16. As shown in FIGS. 2 to 4, the enclosure 11 has a hollow structure inside, and the plurality of battery cells 20 are accommodated in the enclosure 11. The enclosure 11 may include two parts, referred to herein as a first enclosure portion 111 and a second enclosure portion 112 respectively. The first enclosure portion 111 and the second enclosure portion 112 are snap-fitted together. The first enclosure portion 111 and the second enclosure portion 112 may be shaped depending on the shape of a component accommodated inside, for example, the shape of a combination of the plurality of battery cells 20 accommodated inside, and at least one of the first enclosure portion 111 and the second enclosure portion 112 is provided with an opening. For example, as shown in FIG. 2., only one of the first enclosure portion 111 and the second enclosure portion 112 may be a hollow cuboid provided with an opening, and the other one may be plate-shaped to cover the opening. For example, taking an example herein in which the second enclosure portion 112 is a hollow cuboid provided with an opening 1113 and the first enclosure portion 111 is plate-shaped, the first enclosure portion 111 covers the opening of the second enclosure portion 112 to form the enclosure 11 provided with an enclosed chamber that may be used for accommodating the plurality of battery cells 20. The plurality of battery cells 20 are connected to each other in parallel or in series or in series and parallel before being placed in the enclosure 11 formed by snap-fitting the first enclosure portion 111 and the second enclosure portion 112.

For another example, different from that shown in FIG. 2, each of the first enclosure portion 111 and the second enclosure portion 112 may be a hollow cuboid and has one side with an opening, the opening of the first enclosure portion 111 and the opening of the second enclosure portion 112 are provided opposite each other, and the first enclosure portion 111 and the second enclosure portion 112 are snap-fitted to each other to form the enclosure 11 provided with an enclosed chamber.

The enclosure 11 includes an electrical chamber 15 and a collection chamber 16, wherein the electrical chamber 15 is configured to accommodate the plurality of battery cells 20. Specifically, the battery 10 may further include a bus component 14, the bus component 14 may be used for achieving an electrical connection, such as parallel connection, series connection, or series-parallel connection, between the plurality of battery cells 20. Specifically, the bus component 14 may implement the electrical connection between the battery cells 20 by connecting electrode terminals of the battery cells 20. Further, the bus component 14 may be fixed to the electrode terminals of the battery cells 20 by welding.

In an embodiment of the present application, the electrical chamber 15 accommodates the plurality of cylindrical battery cells 20, and the plurality of battery cells 20 may be arranged and assembled by a certain pattern to improve the space utilization of the electrical chamber 15, thus improving energy density of the battery 10. For example, the plurality of battery cells 20 may have the same or different dimensions. The plurality of battery cells 20 are illustrated in this embodiment of the present application with the same dimensions, which can make the plurality of battery cells 20 have the same capacity, so as to facilitate the electrical connection between the plurality of battery cells 20, and also facilitate the arrangement of the plurality of battery cells 20.

Specifically, as shown in FIGS. 2 to 4, the electrical chamber 15 accommodates a plurality of battery cell groups arranged in the first direction Z, each of the plurality of battery cell groups includes a plurality of battery cells 20 arranged in the second direction Y, and the first direction Z, the second direction Y and the axial direction X of the battery cells 20 are perpendicular to each other. For a cylindrical battery cell 20, the axial direction X of the battery cell 20 is the axial direction X of the cylinder. The plurality of battery cells 20 in the electrical chamber 15 are arranged into an array, so that space of the electrical chamber 15 can be effectively used.

Moreover, considering features of the cylinder, the plurality of battery cell groups can be staggered to reduce the gap between the battery cells 20, thus improving the space utilization. Specifically, as shown in FIGS. 2 to 4, for a plane perpendicular to the first direction Z, projections of axes of the plurality of battery cells 20 on the plane do not overlap each other. Further, the projections of the axes of the plurality of battery cells 20 on this plane may have equal spacing, which allows the battery cells 20 of different battery cell groups to be arranged in a staggering manner, so that space is utilized reasonably and the gap between the battery cells 20 is reduced.

The cylindrical side surface of the battery cell 20 in the embodiments of the present application is provided with the pressure relief mechanism 21. The cylindrical side surface is a curved surface around the axial direction X of the battery cell 20, i.e., the side of the cylinder. The pressure relief mechanism 21 may be disposed in various manners. For example, the pressure relief mechanism 21 may be an indentation on the battery cell 20 such that the thickness of a shell of the battery cell 20 at the pressure relief mechanism 21 is less than the thickness of other regions, that is, the strength of the pressure relief mechanism 21 is relatively weak. In this way, when thermal runaway occurs in the battery cell 20 and the internal temperature or pressure of the battery cell reaches a preset value, the pressure relief mechanism 21 can be broken at the indentation to relieve the internal pressure or temperature. For another example, the pressure relief mechanism 21 may also be made of a thermosensitive material. In this way, when thermal runaway occurs in the battery cell 20 and the internal temperature of the battery cell reaches a preset value, the pressure relief mechanism 21 can be melted to relieve the internal pressure or temperature. However, the embodiments of the present application are not limited thereto.

In the embodiments of the present application, the battery 10 further includes the collection chamber 16 to collect the emissions discharged through the pressure relief mechanism 21 after the pressure relief mechanism 21 is actuated so as to prevent short circuits caused by the emissions contacting high-voltage components. Specifically, to achieve directional pressure relief of the pressure relief mechanism 21 towards the collection chamber 16, the battery 10 includes the isolation component 12, the isolation component 12 being configured to isolate the electrical chamber 15 from the collection chamber 16. As shown in FIGS. 2 to 4, the isolation component 12 includes a first region 121 and a second region 122, the first region 121 is used for accommodating a first portion 22 of the battery cell 20 such that the first portion 22 protrudes, towards the collection chamber 16, from the surface of the second region 122 facing towards the collection chamber 16. Moreover, the pressure relief mechanism 21 is disposed in the region of the cylindrical side surface located in the first portion 22, such that when the pressure relief mechanism 21 is actuated, the emissions discharged from the pressure relief mechanism 21 can enter the collection chamber 16 smoothly.

It should be understood that the isolation component 12 of the embodiment of the present application may serve as a thermal management component, that is, the isolation component 12 may accommodate a fluid to adjust the temperature of the plurality of battery cells 20. The fluid here may be liquid or gas, and temperature adjustment refers to heating or cooling the plurality of battery cells 20. In the case of cooling or lowering the temperature of the battery cell 20, the isolation component 12 is configured to accommodate a cooling fluid to lower the temperature of the plurality of battery cell 20. In addition, the isolation component 12 may further be configured to heat and rise the temperature of the plurality of battery cells 20, which is not limited in the embodiments of the present application. Optionally, the fluid may flow in a circulating manner to achieve better temperature adjustment effects. Optionally, the fluid may be water, a mixture of water and ethylene glycol, air, etc.

Optionally, as shown in FIGS. 2 to 4, the plurality of battery cells 20 of the same battery cell group correspond to the same isolation component 12. Considering the arrangement pattern of the battery cells 20 in the battery 10, the plurality of battery cells 20 of the same battery cell group are disposed corresponding to the same isolation component 12, the plurality of battery cells 20 then correspond to the same collection chamber 16, that is, the emissions discharged from pressure relief mechanisms 21 of the plurality of battery cells 20 can be discharged to the same collection chamber 16, thereby saving space and improving the space utilization of the battery 10.

As shown in FIGS. 2 to 4, the plurality of battery cells 20 of the same battery cell group are in a one-to-one correspondence with a plurality of first regions 121 on the same isolation component 12. In the case that each battery cell 20 of the plurality of battery cells 20 of the same battery cell group is provided with a first region 121 correspondingly, the emissions can be directly discharged through the corresponding first region 121 of the isolation component 12 when thermal runaway occurs in any of the battery cells 20. In addition, the battery cells 20 are each of a cylinder shape, the plurality of battery cells 20 of the same battery cell group are disposed in one-to-one correspondence with the plurality of first regions 121 on the same isolation component 12, so that it is possible to ensure that each battery cell 20 can discharge emissions towards the collection chamber 16 directionally when thermal runaway occurs in the battery cell, and moreover, each battery cell 20 can be positioned and mounted by the first region 121 such that the first portion 22 of the battery cell 20 can be located in the first region 121, improving the stability of the battery 10.

Optionally, two adjacent battery cell groups of the plurality of battery cell groups correspond to two isolation components 12 disposed opposite each other such that the electrical chamber 15 is disposed between the two isolation components 12 and the electrical chamber 15 is located between two collection chambers 16. As shown in FIGS. 2 to 4, for any two adjacent battery cell groups in the first direction Z, the two battery cell groups are disposed in the same electrical chamber 15, such that space of the electrical chamber 15 can be saved by staggering of the battery cells 20 of the two battery cell groups. In this case, the two collection chambers 16 corresponding to the two battery cell groups can be respectively located on two opposite sides of the electrical chamber 15, so that the thickness of the battery 10 in the first direction Z can be minimized. Especially when the battery 10 only includes two battery cell groups, this arrangement not only facilitates mounting and positioning of each battery cell 20, but can also greatly improves the space utilization of the battery 10.

Optionally, the battery 10 according to the embodiments of the present application further includes: two end plates 13. The two end plates 13 are respectively disposed, in the axial direction X of the battery cells 20, on two sides of the two adjacent battery cell groups, and the two end plates 13 are connected to the two isolation components 12 to form the electrical chamber 15. A plurality of isolation components 12 in the embodiments of the present application are disposed in the first direction Z. For example, two isolation components 12 are respectively disposed, in the first direction Z, on two sides of two adjacent battery cell groups, so that the two isolation components 12 can limit the movement, in the first direction Z, of the plurality of battery cells 20 inside. Moreover, the two end plates 13 are respectively disposed, in the axial direction X of the battery cells 20, on two sides of the two adjacent battery cell groups, so that the movement, in the axial direction X of the battery cells 20, of the battery cells of the two battery cell groups can be further restricted to fix the battery cells 20 and improve the stability of the battery 10.

Optionally, as shown in FIGS. 2 to 4, the surface of the end plate 13 towards the battery cells 20 may also be provided with limiting structures 133 for fixing the battery cells 20. Specifically, the limiting structures 133 may be in a one-to-one correspondence with the battery cells 20 to be used for restricting the movement of each battery cell 20. The limiting structure 133 may be a protrusion structure protruding on the surface of the end plate 13 protruding towards the battery cell 20. For example, a bracket-shaped limiting structure 133 as shown in the figure can be provided corresponding to the cylindrical battery cell 20 to restrict the movement of the battery cell 20 in the first direction Z or in the second direction Y, so as to further improve the stability of the battery 10.

Figure 5:
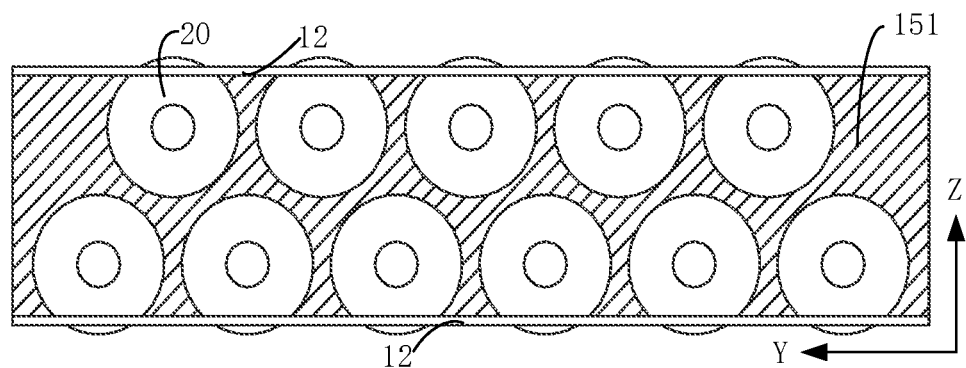
FIG. 5 is a partial cross-sectional diagram of a battery disclosed in an embodiment of the present application.

It should be understood that the end plate 13, the isolation component 12, and the second enclosure portion 112 in the embodiments of the present application can be used to form the electrical chamber 15, as shown in FIGS. 2 to 4. Optionally, the electrical chamber 15 is provided with a filler 151, and the filler 151 is used to fill voids between the plurality of battery cells 20. FIG. 5 shows a schematic diagram of the electrical chamber 15 according to an embodiment of the present application. As shown in FIG. 5, since the battery cells 20 are cylindrical in shape and the electrical chamber 15 formed by the end plate 13, the isolation component 12, and the second enclosure portion 112 is usually a cuboid, there are voids in the electrical chamber 15. The voids are filled with the filler 151, which can provide a restraint for the battery cells 20 inside and prevent the battery cell 20 from moving in one aspect. In another aspect, the filler 151 can also restrict a shell of the battery cell 20, and prevent the portion of the surface of the battery cell 20 located inside the electrical chamber 15 other than the first portion 22 from being ruptured when thermal runaway occurs in a certain battery cell 20, thereby preventing the spread of thermal runaway and improving safety performance of the battery 10.

Optionally, in the case where the filler 151 is disposed in the electrical chamber 15, the portion of the battery cell 20 disposed in the electrical chamber 15 has an increased strength due to the restraint effect of the filler 151, and its strength is greater than the strength of the first portion 22. In this case, when thermal runaway occurs in this battery cell 20, even if this battery cell 20 is not provided with the pressure relief mechanism 21, the probability of the first portion 22 being ruptured is much greater than that of other portions located in the electrical chamber 15. Therefore, the battery cell 20 may not be provided with the pressure relief mechanism 21, or the pressure relief mechanism 21 of the battery cell 20 is the first portion 22, and there is no need to form the pressure relief mechanism 21 by additionally providing an indentation region or a thermosensitive region, so that a manufacturing process of the battery cell 20 can be simplified, and directional blasting of the battery cell 20 as well as discharging the emissions towards the collection chamber 16 can be ensured.

Optionally, the filler 151 in the embodiment of the present application may choose a material with a good heat dissipation effect. For example, the filler 151 may be a thermally conductive adhesive. However, the embodiments of the present application are not limited thereto.

Figure 6:
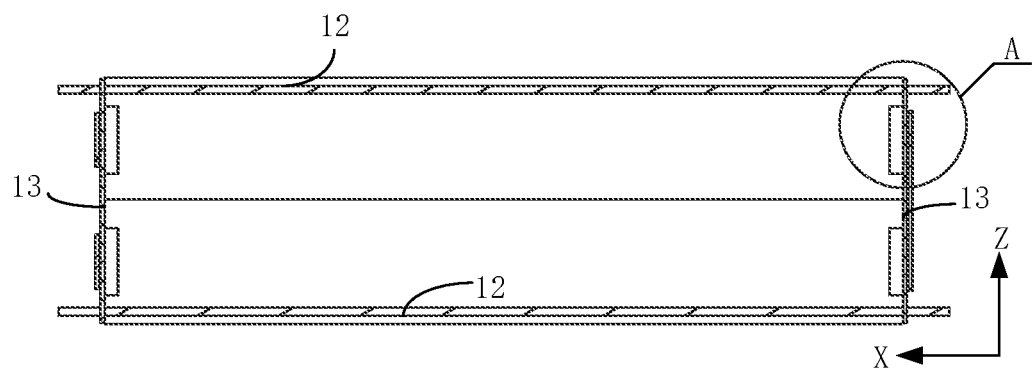
FIG. 6 is another partial cross-sectional diagram of the battery disclosed in an embodiment of the present application.
Figure 7:
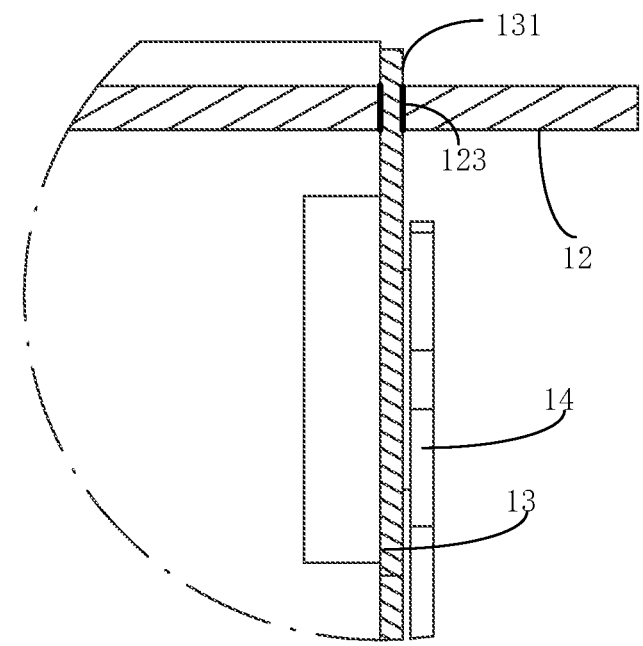
FIG. 7 is an enlarged view of region A in FIG. 6.

It should be understood that the connection manner between the end plate 13 and the isolation component 12 in the embodiment of the present application can be set flexibly according to the actual application. The embodiments of the present application are not limited thereto. For example, each end plate 13 of the two end plates 13 is provided with a first protrusion 131 protruding in the first direction Z, the isolation component 12 is provided with a first through-hole 123, and the first protrusion 131 passes through the first through-hole 123 such that each of the end plates 13 is fixedly connected to the isolation component 12. Specifically, FIG. 6 shows a partial schematic diagram of another cross-section of the battery 10 according to an embodiment of the present application. The cross-section is a plane perpendicular to the second direction Y. The battery 10 shown in FIG. 6 may be the battery 10 as shown in FIGS. 2 to 4; and FIG. 7 is a partial enlarged view of region A in FIG. 6. As shown in FIGS. 6 and 7, each end plate 13 may be provided with at least one first protrusion 131, the first protrusion 131 protrudes towards the isolation component 12; correspondingly, each isolation component 12 may be provided with at least one first through-hole 123; each first protrusion 131 passes through the corresponding first through-hole 123 to fix the end plate 13 and the isolation component 12. This fixing manner facilitates machining and assembling, and can improve the manufacturing efficiency of the battery 10.

Optionally, the first through-hole 123 and the first protrusion 131 may have the same or different shapes, which can be set flexibly according to the actual application. For example, as shown in FIGS. 6 and 7, the shapes of the first through-hole 123 and the first protrusion 131 may be set to be the same, for example, both are set to be rectangular, and the dimension of the first protrusion 131 is slightly smaller than the dimension of the first through-hole 123, so that the first protrusion 131 can pass through the first through-hole 123 and be stably fixed in the first through-hole 123, making the end plate 13 and the isolation component 12 stabilized relatively.

Optionally, each end plate 13 is provided with a plurality of first protrusions 131, and correspondingly, the isolation component 12 is also provided with a plurality of first through-holes 123, so that the end plate 13 and the isolation component 12 are stabilized better. Here, the plurality of first protrusions 131 may have the same or different dimensions, and the spacing between the plurality of first protrusions 131 may be the same or different. For example, the plurality of first protrusions 131 may be distributed on the end portion of the end plate 13 towards the isolation component 12 so that different regions of the end plate 13 are all stably connected to the isolation component 12.

Figure 8:
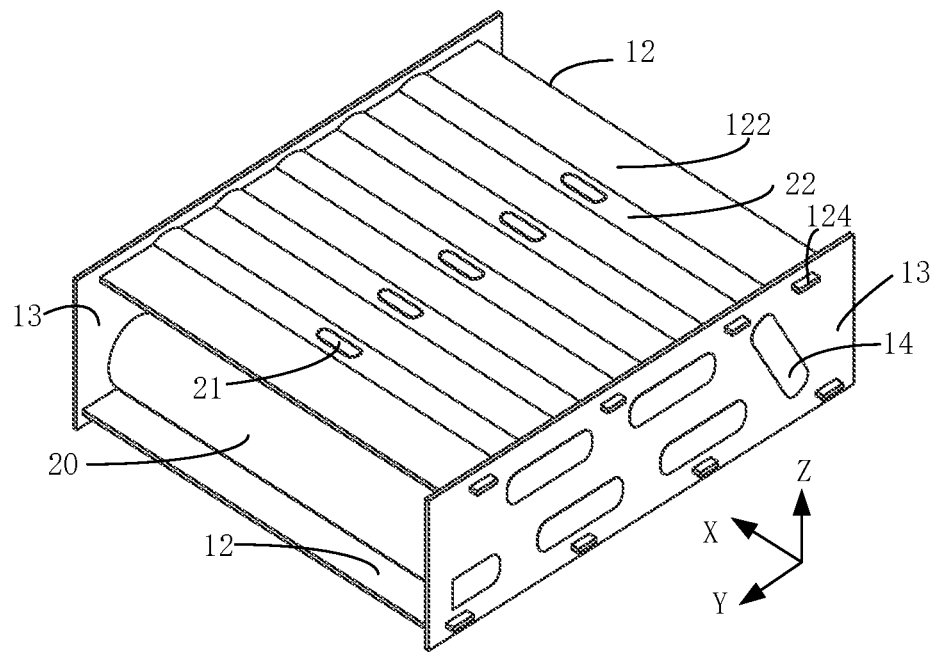
FIG. 8 is a partial schematic diagram of another battery disclosed in an embodiment of the present application.
Figure 9:
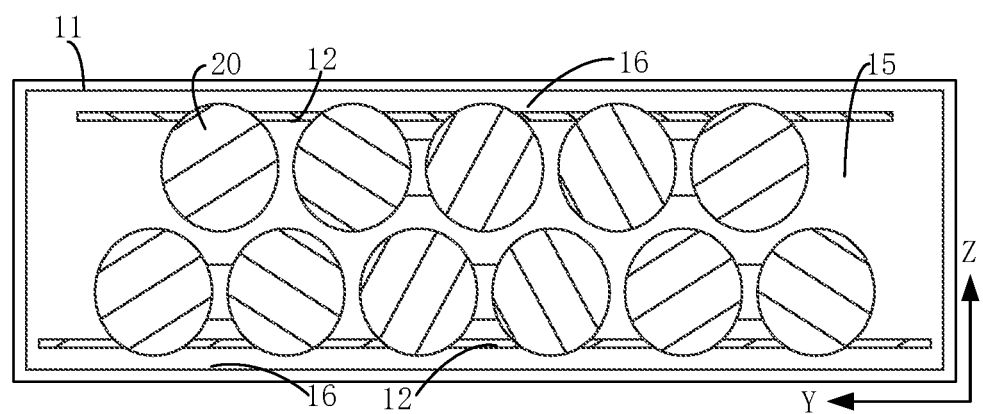
FIG. 9 is a cross-sectional diagram of another battery disclosed in an embodiment of the present application.
Figure 10:
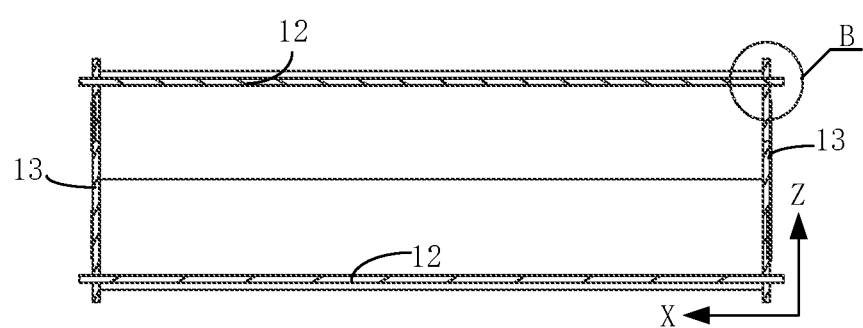
FIG. 10 is a partial cross-sectional diagram of another battery disclosed in an embodiment of the present application.
Figure 11:
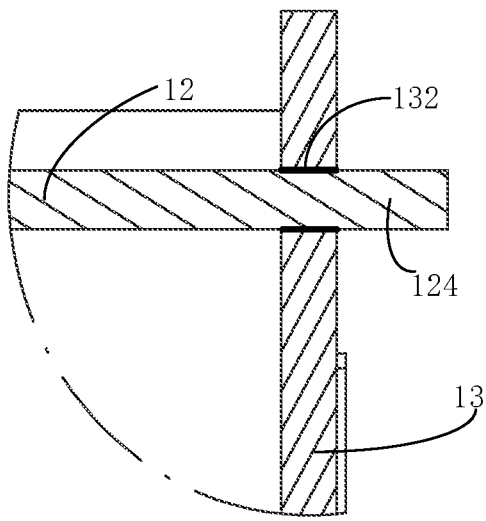
FIG. 11 is an enlarged view of region B in FIG. 10.

For another example, similarly, each end plate 13 of the two end plates 13 is provided with a second through-hole 132, the isolation component 12 is provided with a second protrusion 124 protruding in the axial direction X of the battery cell 20, and the second protrusion 124 passes through the second through-hole 132 such that each of the end plates 13 is fixedly connected to the isolation component 12. FIG. 8 shows a schematic diagram of an assembly of some components in a battery 10 according to another embodiment of the present application. FIG. 9 is a cross-sectional view of a battery 10 according to another embodiment of the present application. The cross-section may be a plane perpendicular to the axial direction X of the battery cell 20 in the battery 10, and the battery 10 of FIG. 8 is a portion of the battery 10 shown in FIG. 9. FIG. 10 shows a partial schematic diagram of another cross-section of a battery 10 according to another embodiment of the present application. The cross-section is a plane perpendicular to the second direction Y, and the battery 10 shown in FIG. 10 may be a portion of the battery 10 as shown in FIG. 8. FIG. 11 is an enlarged view of region B in FIG. 10. As shown in FIGS. 8 to 11, each end plate 13 is provided with at least one second through-hole 132; correspondingly, each isolation component 12 may be provided with at least one second protrusion 124; each second protrusion 124 passes through the corresponding second through-hole 132 to fix the end plate 13 and isolation component 12. This fixing manner facilitates machining and assembling, and can improve the manufacturing efficiency of the battery 10.

Optionally, the second protrusion 124 and the second through-hole 132 may have the same or different shapes which can be set flexibly according to the actual application. For example, as shown in FIGS. 8 to 11, the second through-hole 132 and the second protrusion 124 may be set to have the same shape, for example, both are set to be rectangular, and the dimension of the second protrusion 124 is slightly smaller than the dimension of the second through-hole 132, so that the second protrusion 124 can pass through the second through-hole 132 and be stably fixed in the second through-hole 132, making the end plate 13 and the isolation component 12 stabilized relatively.

Optionally, each isolation component 12 may be provided with a plurality of second protrusions 124, and correspondingly, the end plate 13 may also be provided with a plurality of second through-holes 132, making the end plate 13 and the isolation component 12 stabilized better. The plurality of second protrusions 124 may have the same or different dimensions, and the spacing between the plurality of second protrusions 124 may be the same or different. For example, the plurality of second protrusions 124 may be distributed on an edge portion of the isolation component 12 towards the end plate 13, so that different regions of the isolation component 12 are all stably connected to the end plate 13.

Figure 12:
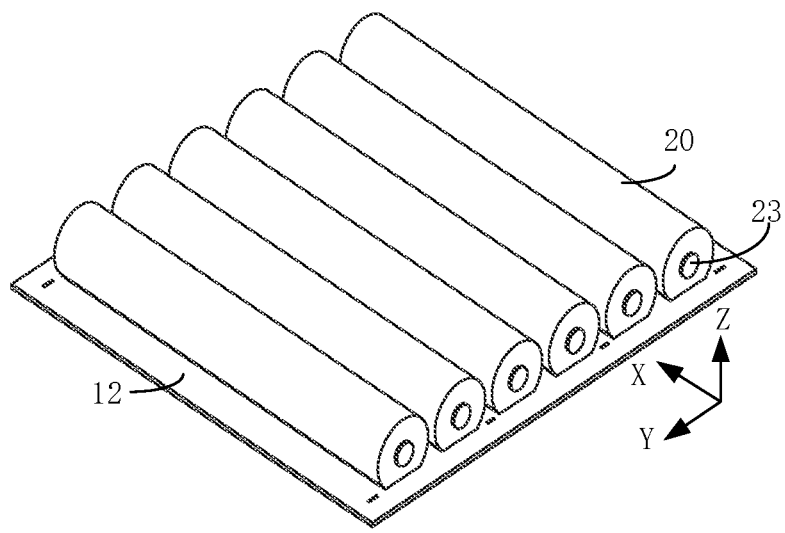
FIG. 12 is a schematic diagram of battery cells and an isolation component disclosed in an embodiment of the present application.
Figure 13:
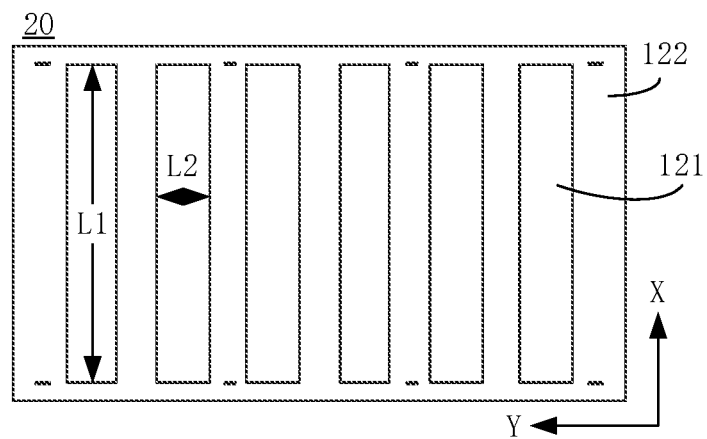
FIG. 13 is a schematic top view of an isolation component disclosed in an embodiment of the present application.
Figure 14:
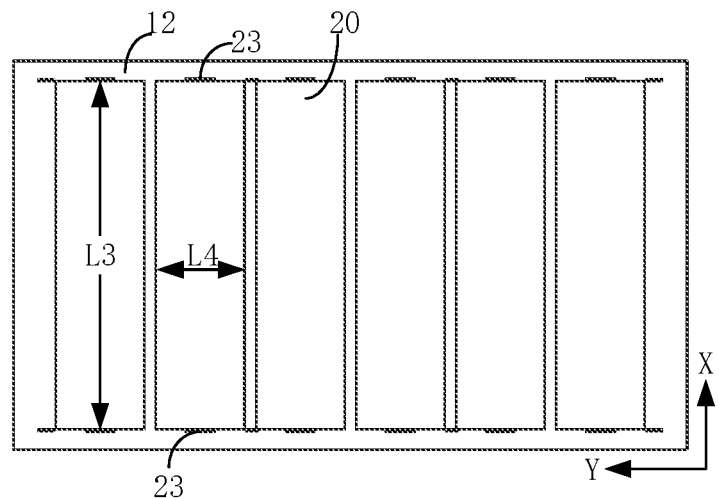
FIG. 14 is a schematic top view of battery cells and an isolation component disclosed in an embodiment of the present application.

The battery cell 20 and the isolation component 12 corresponding thereto in the embodiments of the present application will be described in detail below with reference to the accompanying drawings. FIG. 12 shows a schematic diagram of battery cells 20 and an isolation component 12 corresponding thereto, where the battery cells 20 may be the battery cells 20 included in any of the battery cell group shown in FIGS. 2 to 12, and the first portion 22 of the battery cell 20 is disposed in the first region 121 of the corresponding isolation component 12. FIG. 13 is a schematic top view of an isolation component 12. The isolation component 12 in FIG. 13 may be the isolation component 12 in FIG. 12. FIG. 14 shows a schematic top view of battery cells 20 and an isolation component 12 corresponding thereto. The battery cells 20 and the isolation component 12 in FIG. 14 may be the battery cells 20 and the isolation component 12 in FIG. 12.

As shown in FIGS. 12 to 14, the battery cell 20 in the embodiments of the present application further includes an electrode terminal 23. The electrode terminal 23 may be configured to be electrically connected to an electrode assembly inside the battery cell 20 to output electrical energy of the battery cell 20. Specifically, the battery cell may include two electrode terminals 23. The electrode terminal may include a positive electrode terminal and a negative electrode terminal. The positive electrode terminal is configured to be electrically connected to a positive tab, and the negative electrode terminal is configured to be electrically connected to a negative tab. The positive electrode terminal may be directly or indirectly connected to the positive tab, and the negative electrode terminal may be directly or indirectly connected to the negative tab. For example, the positive electrode terminal is electrically connected to the positive tab by means of a connecting member, and the negative electrode terminal is electrically connected to the negative tab by means of another connecting member.

Optionally, as shown in FIGS. 12 to 14, for the cylindrical battery cell 20 in the embodiments of the present application, the battery cell 20 is provided with electrode terminals 23 on two cylindrical bottom surfaces. In this way, by providing a plurality of bus components 14 respectively at two ends of the plurality of battery cells 20, the electrical connection between the plurality of battery cells 20 can be achieved, and assembling and electrical connection are facilitated.

Optionally, as shown in FIGS. 12 to 14, considering that the plurality of battery cells 20 disposed in the battery 10 usually have the same shape and dimension, correspondingly, the plurality of first regions 121 on the isolation component 12 may also have the same shape and dimension. This facilitates machining of the isolation component 12, and also allows any one of the first regions 121 to be adapted to any one of the battery cells 20 during mounting, thereby improving the manufacturing efficiency of the battery 10.

Optionally, the shapes of the plurality of first regions 121 provided on the isolation component 12 may be set according to the practical application. For example, an orthographic projection of each first region 121 on the surface of the isolation component 12 towards the electrical chamber 15 may be rectangular, triangular or oval, etc. FIGS. 12 to 14 show the orthographic projection as a rectangle, for example. In one aspect, it is easy to machine the rectangle, and in another aspect, when the orthographic projection is a rectangle, the length, in the axial direction X of the battery cell 20, of the orthographic projection at different positions is the same, and the length, in the second direction Y, of the orthographic projection is also the same. In this way, when the cylindrical battery cell 20 is partially disposed in the first region 121, the plurality of battery cells 20 may have the relatively uniform dimensions in each direction, for example, there is no circumstance that some of the battery cells 20 protrude more than other battery cells 20, and thus the space utilization of the battery 10 is improved.

As shown in FIGS. 12 to 14, the length L1, in the axial direction X of the battery cell 20, of the orthographic projection of the first region 121 on a surface of the isolation component 12 facing towards the electrical chamber 15 is greater than or equal to the length L3, in the axial direction X of the battery cell 20, of the cylindrical side surface of the battery cell 20; and the length L2, in the second direction Y, of the orthographic projection is less than the diameter L4 of the battery cell 20, where the second direction Y is a direction, in a plane where the orthographic projection is located, perpendicular to the axial direction X of the battery cell 20.

Specifically, the orthographic projection of the first region 121 on the surface of the isolation component 12 towards the electrical chamber 15 may be of any shape. The length L1 of the orthographic projection in the axial direction X of the battery cell 20 may be the smallest of the lengths in the axial direction X of the battery cell 20 at various positions of the orthographic projection. Similarly, the length L2 of the orthographic projection in the second direction Y is the smallest of the lengths in the second direction Y at various positions of the orthographic projection. Since the length L1 is greater than or equal to the length L3 and the length L2 is less than the length L4, for the first portion 22 of the battery cell 20 located in the first region 121, the first portion 22 is only a partial region of the battery cell 20 and not the whole and is a small region of the battery cell 20, and the first portion 22 does not occupy too much region of the collection chamber 16 and has less impact on the collection chamber 16.

Figure 15:
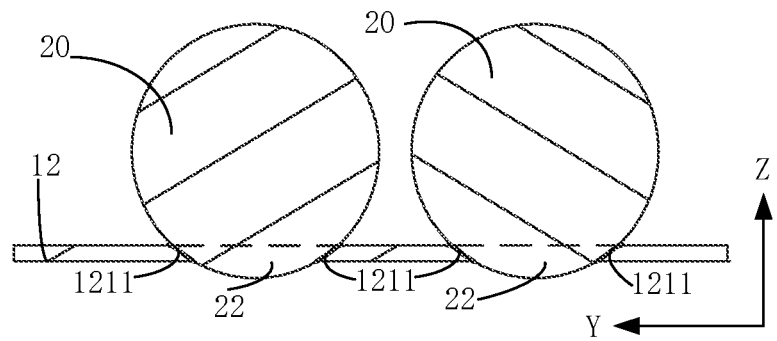
FIG. 15 is a cross-sectional view of two battery cells and an isolation component disclosed in an embodiment of the present application.

It should be understood that the first region 121 in the embodiments of the present application can accommodate the first portion 22 of the battery cell 20, and this first region may be set into any shape according to the practical application. For example, the first region 121 is an opening extending through the isolation component 12. FIG. 15 shows a partial cross-sectional diagram of two battery cells 20 and a corresponding isolation component 12. The cross-section is a plane perpendicular to the axial direction X of the battery cell 20. Moreover, the two battery cells 20 in FIG. 15 may be any two adjacent battery cells 20 of the battery 10 as shown in FIGS. 2 to 14. The two battery cells 20 correspond to two adjacent first regions 121 of the same isolation component 12.

As shown in FIG. 15, in the embodiment of the present application, in the case that the first region 121 is an opening on the isolation component 12, in one aspect, it is easy to machine the opening; in another aspect, when the pressure relief mechanism 21 located in the first portion 22 is actuated, there is no obstruction and the emissions can be directly discharged to the collection chamber 16 through the opening, and the internal pressure and temperature of the battery cell 20 with thermal runaway can be relieved in time to prevent thermal diffusion and improve the safety of the battery 10.

Optionally, the isolation component 12 has circular-arc surfaces 1211 at the opening to allow the first portion 22 to fit the isolation component 12 inside the opening. As shown in FIG. 15, the battery cell 20 has a curved side surface, the first region 121 is provided with circular-arc surfaces 1211, and the first portion 22 fits the circular-arc surfaces 1211. That is, the battery cell 20 and the isolation component 12 have a surface contact instead of a linear contact, which expands the area of contact between the two. Accordingly, in one aspect, the stability of the battery cell 20 in the first region 121 can be improved and the battery cell is less prone to displacement, and in another aspect, when the isolation component 12 is a thermal management component, the temperature adjustment efficiency can also be improved.

Figure 16:
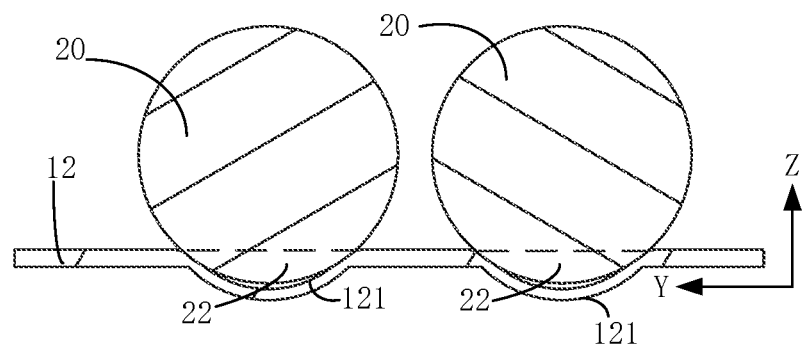
FIG. 16 is another cross-sectional view of two battery cells and an isolation component disclosed in an embodiment of the present application.
Figure 17:
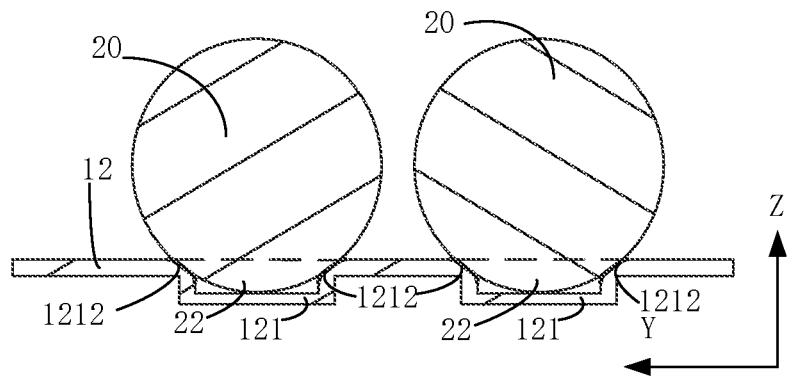
FIG. 17 is still another cross-sectional view of two battery cells and an isolation component disclosed in an embodiment of the present application.

For another example, the first region 121 is a recess on the isolation component 12, and the recess protrudes, towards the collection chamber 16, from the surface of the second region 122 facing towards the collection chamber 16. FIGS. 16 and 17 show two partial cross-sectional diagrams of two battery cells 20 and a corresponding isolation component 12, respectively. The cross-section is a plane perpendicular to the axial direction X of the battery cell 20. The two battery cells 20 in FIGS. 16 and 17 may be any two adjacent battery cells of the battery 10, and the two battery cells 20 correspond to two adjacent first regions 121 of the same isolation component 12.

As shown in FIGS. 16 and 17, the first region 121 may be a recess on the isolation component 12. In this way, when the battery 10 is in normal use, the electrical chamber 15 and the collection chamber 16 on two sides of the isolation component 12 are relatively enclosed. When thermal runaway occurs in any battery cell 20, the pressure relief mechanism 21 of the battery cell is actuated such that emissions are discharged, and the emissions can rupture the recess of the first region 121 corresponding to the pressure relief mechanism 21 to be allowed to enter the collection chamber 16. Moreover, since the recess of the first region 121 at another position is not ruptured, the emissions (especially high-temperature gases or flames) entering the collection chamber 16 do not return to the electrical chamber 15 through the first region 121 at another position, and accordingly, the impact on another battery cell 20 can be prevented, the possibility of thermal diffusion can be reduced, and the safety of the battery 10 is improved.

Optionally, the shape of the cross-section of the recess of the first region 121 in a plane perpendicular to the axial direction X of the battery cell 20 may be set flexibly according to the practical application. For example, the cross-section may be circular or rectangular in shape. However, the embodiments of the present application are not limited thereto.

For example, as shown in FIG. 16, the recess has a circular-arc in a first plane, and the first plane is a plane perpendicular to the axial direction X of the battery cell 20. The recess having a circular-arc cross-section occupies less space in the collection chamber 16 and has less impact on the arrangement of the collection chamber 16 as compared with recesses in other shapes.

Further, when the recess has the circular-arc cross-section in the first plane, the first portion 22 fits the isolation component 12 inside the recess. That is, the area of contact between the battery cell 20 and the isolation component 12 is a circular-arc surface instead of a linear contact, thus the area of contact between the two is expanded. Accordingly, in one aspect, the stability of the battery cell 20 in the first region 121 can be improved, and in another aspect, when the isolation component 12 is a thermal management component, the temperature adjustment efficiency can also be improved.

For another example, as shown in FIG. 17, the recess has a rectangular cross-section in a first plane, and the first plane is a plane perpendicular to the axial direction X of the battery cell 20. It is easy to machine the rectangular recess, for example, it can be machined quickly by stamping.

Further, when the recess has the rectangular cross-section in the first plane, the isolation component 12 has circular-arc surfaces 1212 at the opening of the recess to allow the first portion 22 to fit the isolation component 12 at the opening of the recess. That is, the battery cell 20 and the isolation component 12 have a surface contact instead of a linear contact, which expands the area of contact between the two. Accordingly, in one aspect, the stability of the battery cell 20 in the first region 121 can be improved, and in another aspect, when the isolation component 12 is a thermal management component, the temperature adjustment efficiency can also be improved.

It should be understood that, as shown in FIGS. 16 and 17, when the first region 121 is a recess, a bottom wall of the recess may shield the pressure relief mechanism 21 of the battery cell 20. In order to increase an emission speed of this pressure relief mechanism 21 to the collection chamber 16, a clearance region may be provided on the bottom wall of the recess. The clearance region corresponds to the pressure relief mechanism 21 in position, so that the emissions from the pressure relief mechanism 21 can be discharged to the collection chamber 16 by rupturing the clearance region, thereby relieving the internal pressure and temperature of the battery cell 20 in time. However, the embodiments of the present application are not limited thereto.

Optionally, the clearance region on the bottom wall of the recess may be implemented in any manners. For example, an indentation may be provided on the bottom wall to form the clearance region, or a thermosensitive material may be provided on the bottom wall to form the clearance region. The embodiments of the present application are not limited thereto.

The battery 10 and the power consuming apparatus according to the embodiments of the present application are described above, and a method and apparatus for manufacturing a battery according to the embodiments of the present application will be described below. For the parts not described in detail, reference can be made to the foregoing embodiments.

Figure 18:
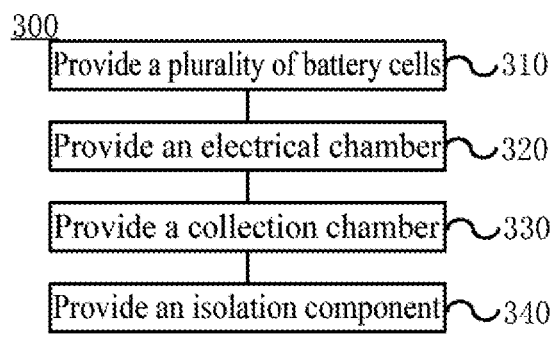
FIG. 18 is a schematic flowchart of a method for manufacturing a battery disclosed in an embodiment of the present application.

FIG. 18 shows a schematic flowchart of a method 300 for manufacturing a battery according to an embodiment of the present application. As shown in FIG. 18, the method 300 may include: S310, providing a plurality of battery cells 20, the battery cell 20 being of a cylinder shape, a cylindrical side surface of the battery cell 20 being provided with a pressure relief mechanism 21, the pressure relief mechanism 21 being configured to be actuated, when an internal pressure or temperature of the battery cell 20 reaches a threshold, to relieve the internal pressure; S320, providing an electrical chamber 15, the electrical chamber 15 being configured to accommodate the plurality of battery cells 20; S330, providing a collection chamber 16, the collection chamber 16 being configured to collect emissions from the battery cells 20 when the pressure relief mechanism 21 is actuated; and S340, providing an isolation component 12, the isolation component 12 being configured to isolate the electrical chamber 15 from the collection chamber 16, wherein the isolation component 12 comprises a first region 121 and a second region 122, the first region 121 is used for accommodating a first portion 22 of the battery cell 20 such that the first portion 22 protrudes, towards the collection chamber 16, from a surface of the second region 122 facing towards the collection chamber 16, and the pressure relief mechanism 21 is arranged in a region of the cylindrical side surface located in the first portion 22 such that the emissions are allowed to enter the collection chamber 16 when the pressure relief mechanism 21 is actuated.

Figure 19:
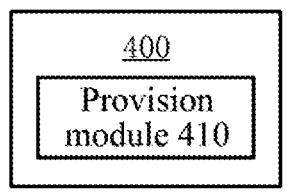
FIG. 19 is a block diagram of an apparatus for manufacturing a battery disclosed in an embodiment of the present application.

FIG. 19 shows a block diagram of an apparatus 400 for manufacturing a battery according to an embodiment of the present application. As shown in FIG. 19, the apparatus 400 may include: a provision module 410, the provision module 410 being configured to: provide a plurality of battery cells 20, the battery cell 20 being of a cylinder shape, a cylindrical side surface of the battery cell 20 being provided with a pressure relief mechanism 21, the pressure relief mechanism 21 being configured to be actuated, when an internal pressure or temperature of the battery cell 20 reaches a threshold, to relieve the internal pressure; provide an electrical chamber 15, the electrical chamber 15 being configured to accommodate the plurality of battery cells 20; provide a collection chamber 16, the collection chamber 16 being configured to collect emissions from the battery cell 20 when the pressure relief mechanism 21 is actuated; and provide an isolation component 12, the isolation component 12 being configured to isolate the electrical chamber 15 from the collection chamber 16, wherein the isolation component 12 includes a first region 121 and a second region 122, the first region 121 is used for accommodating a first portion 22 of the battery cell 20 such that the first portion 22 protrudes, towards the collection chamber 16, from a surface of the second region 122 facing towards the collection chamber 16, and the pressure relief mechanism 21 is arranged in a region of the cylindrical side surface located in the first portion 22 such that the emissions are allowed to enter the collection chamber 16 when the pressure relief mechanism 21 is actuated.

Although the present application has been described with reference to some embodiments, various modifications can be made, and equivalents can be provided to substitute for the components thereof without departing from the scope of the present application. In particular, the technical features mentioned in the embodiments can be combined in any manner as long as there is no structural conflict. The present application is not limited to the specific embodiments disclosed herein and instead includes all the technical solutions that fall within the scope of the claims.

What is claimed is:

1. A battery, comprising:
   a battery cell, the battery cell being of a cylinder shape, a cylindrical side surface of the battery cell being provided with a pressure relief mechanism, the pressure relief mechanism being configured to be actuated, in response to an internal pressure or temperature of the battery cell reaching a threshold, to relieve the internal pressure of the battery cell;
   an electrical chamber configured to accommodate the battery cell;
   a collection chamber configured to collect emissions from the battery cell when the pressure relief mechanism is actuated; and
   an isolation component configured to isolate the electrical chamber from the collection chamber, wherein the isolation component comprises a first region and a second region, the first region is used for accommodating a first portion of the battery cell such that the first portion protrudes, towards the collection chamber, from a surface of the second region facing towards the collection chamber, and the pressure relief mechanism is disposed in a region of the cylindrical side surface located in the first portion such that the emissions are allowed to enter the collection chamber when the pressure relief mechanism is actuated.

2. The battery according to claim 1, wherein:
   a length, in an axial direction of the battery cell, of an orthographic projection of the first region on a surface of the isolation component facing towards the electrical chamber is greater than or equal to a length, in the axial direction of the battery cell, of the cylindrical side surface of the battery cell; and
   a length, in a direction perpendicular to the axial direction of the battery cell in a plane where the orthographic projection is located, of the orthographic projection is less than a diameter of the battery cell.

3. The battery according to claim 1, wherein the first region is an opening extending through the isolation component.

4. The battery according to claim 3, wherein the isolation component has a circular-arc surface at the opening to allow the first portion to fit the isolation component inside the opening.

5. The battery according to claim 1, wherein the first region is a recess on the isolation component, and the recess protrudes, towards the collection chamber, from the surface of the second region facing towards the collection chamber.

6. The battery according to claim 5, wherein the recess has a circular-arc cross-section in a plane perpendicular to the axial direction of the battery cell.

7. The battery according to claim 6, wherein the first portion fits the isolation component inside the recess.

8. The battery according to claim 5, wherein the recess has a rectangular cross-section in a plane perpendicular to the axial direction of the battery cell.

9. The battery according to claim 8, wherein the isolation component has a circular-arc surface at the opening of the recess to allow the first portion to fit the isolation component at the opening of the recess.

10. The battery according to claim 1, wherein:
    the battery cell is one of a plurality of battery cells of the battery; and
    the electrical chamber is provided with a filler, and the filler is configured to fill voids between the plurality of battery cells.

11. The battery according to claim 1, wherein:
    the battery cell is one of a plurality of battery cells in one of a plurality of battery cell groups, and the isolation component is one of a plurality of isolation components of the battery;
    the electrical chamber accommodates the plurality of battery cell groups arranged in a first direction, the plurality of battery cells in each of the plurality of battery cell groups are arranged in a second direction, and the first direction, the second direction, and an axial direction of the battery cells are perpendicular to each other, and
    the plurality of battery cells of the same battery cell group correspond to a same isolation component of the plurality of isolation components.

12. The battery according to claim 11, wherein:
    each of the isolation components have a plurality of first regions; and
    the plurality of battery cells of the same battery cell group are in a one-to-one correspondence with the plurality of first regions on the same the isolation component.

13. The battery according to claim 11, wherein:
    the collection chamber is one of a plurality of collection chambers of the battery; and
    two adjacent battery cell groups of the plurality of battery cell groups correspond to two isolation components disposed opposite each other such that the electrical chamber is disposed between the two isolation components and the electrical chamber is located between two collection chambers.

14. The battery according to claim 13, further comprising:
    two end plates, the two end plates being respectively disposed, in the axial direction of the battery cell, on two sides of the two adjacent battery cell groups, and the two end plates being connected to the two isolation components to form the electrical chamber.

15. The battery according to claim 14, wherein:
each end plate of the two end plates is provided with a first protrusion protruding in the first direction, the isolation component is provided with a first through-hole, and the first protrusion passes through the first through-hole such that each of the end plates is fixedly connected to the isolation components; or
each end plate of the two end plates is provided with a second through-hole, the isolation component is provided with a second protrusion protruding in the axial direction of the battery cell, and the second protrusion passes through the second through-hole such that each of the end plates is fixedly connected to the isolation components.

16. A power consuming apparatus, comprising the battery according to claim 1, wherein the battery is configured to supply electrical energy to the power consuming apparatus.

17. A method for manufacturing a battery, comprising:
providing a battery cell, the battery cell being of a cylinder shape, a cylindrical side surface of the battery cell being provided with a pressure relief mechanism, the pressure relief mechanism being configured to be actuated, in response to an internal pressure or temperature of the battery cell reaching a threshold, to relieve the internal pressure;
providing an electrical chamber, the electrical chamber being configured to accommodate the battery cell;
providing a collection chamber, the collection chamber being configured to collect emissions from the battery cell when the pressure relief mechanism is actuated; and
providing an isolation component, the isolation component being configured to isolate the electrical chamber from the collection chamber, wherein the isolation component comprises a first region and a second region, the first region is used for accommodating a first portion of the battery cell such that the first portion protrudes, towards the collection chamber, from a surface of the second region facing towards the collection chamber, and the pressure relief mechanism is arranged in a region of the cylindrical side surface located in the first portion such that the emissions are allowed to enter the collection chamber when the pressure relief mechanism is actuated.

18. An apparatus for manufacturing a battery, the apparatus comprising: a provision module, the provision module being configured to:
provide a battery cells, the battery cell being of a cylinder shape, a cylindrical side surface of the battery cell being provided with a pressure relief mechanism, the pressure relief mechanism being configured to be actuated, in response to an internal pressure or temperature of the battery cell reaching a threshold, to relieve the internal pressure;
provide an electrical chamber, the electrical chamber being configured to accommodate the battery cell;
provide a collection chamber, the collection chamber being configured to collect emissions from the battery cell when the pressure relief mechanism is actuated; and
provide an isolation component, the isolation component being configured to isolate the electrical chamber from the collection chamber, wherein the isolation component comprises a first region and a second region, the first region is used for accommodating a first portion of the battery cell such that the first portion protrudes, towards the collection chamber, from a surface of the second region facing towards the collection chamber, and the pressure relief mechanism is arranged in a region of the cylindrical side surface located in the first portion such that the emissions are allowed to enter the collection chamber when the pressure relief mechanism is actuated.

* * * * *